United States Patent
Bai

(10) Patent No.: US 6,771,031 B1
(45) Date of Patent: Aug. 3, 2004

(54) CONTROL METHOD FOR AN ELECTRIC MOTOR-ACTIVATED CLUTCH MECHANISM

(75) Inventor: Shushan Bai, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/431,998

(22) Filed: May 8, 2003

(51) Int. Cl.[7] .......................... H02K 7/10; H02P 15/02; F16D 43/26
(52) U.S. Cl. .............................. 318/9; 318/265; 318/12; 310/75 R; 310/78; 477/13; 477/70; 192/3.56; 192/48.2
(58) Field of Search ................................ 318/265, 615, 318/616, 599, 472, 9, 432, 478, 377, 76, 560, 611, 52, 69, 8, 12; 180/248, 197, 249, 233, 65.3, 65.2; 123/205, 357; 477/5, 8, 13, 34, 39, 70, 87, 166, 179; 310/75 R, 78, 76; 192/3.55, 3.56, 30 R, 40, 48.2; 375/240.04, 240.06

(56) References Cited

U.S. PATENT DOCUMENTS

| | | | | |
|---|---|---|---|---|
| 3,699,989 A | * | 10/1972 | O'Connor et al. | 137/487.5 |
| 3,878,913 A | * | 4/1975 | Lionts et al. | 180/2.2 |
| 4,975,628 A | * | 12/1990 | Lemieux | 318/599 |
| 5,718,313 A | * | 2/1998 | Sekine | 192/24 |
| 5,789,877 A | * | 8/1998 | Yamada et al. | 318/9 |
| 6,062,330 A | * | 5/2000 | Watson et al. | 180/248 |
| 6,211,794 B1 | * | 4/2001 | DeSoto | 340/686.1 |
| 6,262,556 B1 | | 7/2001 | Hubbard et al. | 318/798 |
| 6,459,226 B1 | * | 10/2002 | Zettel et al. | 318/560 |
| 6,481,517 B1 | * | 11/2002 | Kobayashi et al. | 180/65.3 |

* cited by examiner

*Primary Examiner*—David Martin
*Assistant Examiner*—Eduardo Colon Santana
(74) *Attorney, Agent, or Firm*—Leslie C. Hodges

(57) ABSTRACT

An improved control method activates an electric motor to drive a torque-to-thrust converter for controlling the torque capacity of a clutch mechanism. The control utilizes a model-based feed-forward control in combination with a closed-loop position feed-back control. The desired clutch torque capacity is characterized in terms of a desired motor position, and the feed-forward control models the motor speed and position response to changes in the desired motor position. The modeled speed and position, in turn, are used to create a feed-forward command, and the feed-forward command is combined with a feedback command based on actual position error.

3 Claims, 1 Drawing Sheet

US 6,771,031 B1

CONTROL METHOD FOR AN ELECTRIC MOTOR-ACTIVATED CLUTCH MECHANISM

TECHNICAL FIELD

This invention relates to an electric motor-activated clutch mechanism for an electronically controlled automatic transmission, and more particularly to a control method for operating the motor.

BACKGROUND OF THE INVENTION

While hydraulic controls have traditionally been used to control the torque capacity of an automatic transmission clutch mechanism, the trend is to use electro-hydraulic or electromechanical controls in order to reduce the size and cost of the transmission and to provide increased control flexibility. In a particularly advantageous approach, an electric motor can be used to control the clutch torque capacity by coupling the motor to the clutch through a torque-to-thrust converter such as a ball-ramp or roller-ramp mechanism. In this case, the clutch torque capacity is controlled by controlling the angular position of the motor output shaft.

However, the performance requirements for the control can be difficult to achieve with conventional open-loop or closed-loop control strategies due to variations in the frictional and inertial characteristics of the torque-to-thrust converter. Accordingly, what is needed is a simple, high performance, motor control method for a motor-activated clutch mechanism.

SUMMARY OF THE INVENTION

The present invention is directed to an improved motor position control method for a motor-activated clutch mechanism including a torque-to-thrust converter, where the control utilizes a model-based feed-forward control in combination with a closed-loop position feed-back control. The desired clutch torque capacity is characterized in terms of a desired motor position, and the feed-forward control models the motor speed and position response to changes in the desired motor position. The modeled speed and position, in turn, are used to create a feed-forward command, and the feed-forward command is combined with a feedback command based on actual position error.

DESCRIPTION OF THE PREFERRED EMBODIMENT

Figure 1:
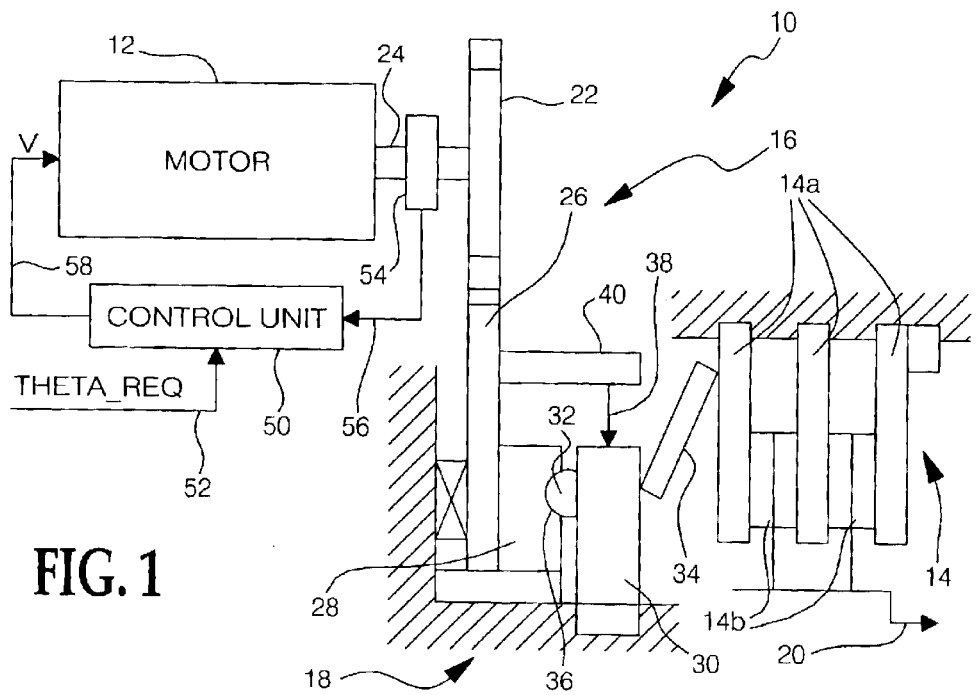
FIG. 1 is a diagram of an electric motor-activated clutch mechanism and microprocessor-based control unit for carrying out the control of this invention.

The control method of the present invention is described in the context of the electric motor-activated clutch mechanism 10 of FIG. 1. Referring to FIG. 1, the electric motor 12 (which may be a DC motor, for example) is coupled to a multi-plate clutch mechanism (such as an automatic transmission clutch) 14 via a reduction gearset 16 and a torque-to-thrust converter 18. In the illustrated embodiment, the clutch 14 has a first set of plates 14a that are grounded and a second set of plates 14b that are secured to a rotary output shaft 20, so that engaging the clutch 14 brakes the output shaft 20. The reduction gearset 16 includes a low-tooth-count input gear 22 that is coupled to the output shaft 24 of motor 12, and a high-tooth-count output gear 26 that is coupled to rotatably drive an input member 28 of torque-to-thrust converter 18. The torque-to-thrust converter 18 additionally includes an output member 30 and a roller 32 disposed between input and output members 28, 30, and a compliance spring 34 is disposed between the output member 30 and one of the grounded clutch plates 14a. The roller 32 is secured to output member 30, and rides in a ramped track 36 of input member 28 so that when motor 12 rotates input member 28 through the reduction gearset 16, the roller 32 and output member 30 will be linearly displaced, either leftward or rightward as viewed in FIG. 1, depending on the direction of rotation of motor 12. The spring 34 serves to maintain the roller 32 in the ramped track 36, and to apply an engagement force to clutch 14 that varies as a function of the linear position of output member 30. Finally, a latch mechanism 38 riding on an axle shaft 40 of output gear 26 operates to prevent lineal displacement of the output member 30 except when driven by the output gear 26.

A microprocessor-based control unit 50 carries out a control according to this invention for positioning the motor output shaft 24 to achieve a desired torque capacity of the clutch 14. In the illustrated embodiment, the desired torque capacity is represented by a corresponding input signal THETA_REQ on line 52 indicative of a requested angular position of motor shaft 24. A shaft position sensor or encoder 54 produces a position feedback signal on line 56, and the control unit 50 produces a motor drive voltage V on line 58.

Figure 2:
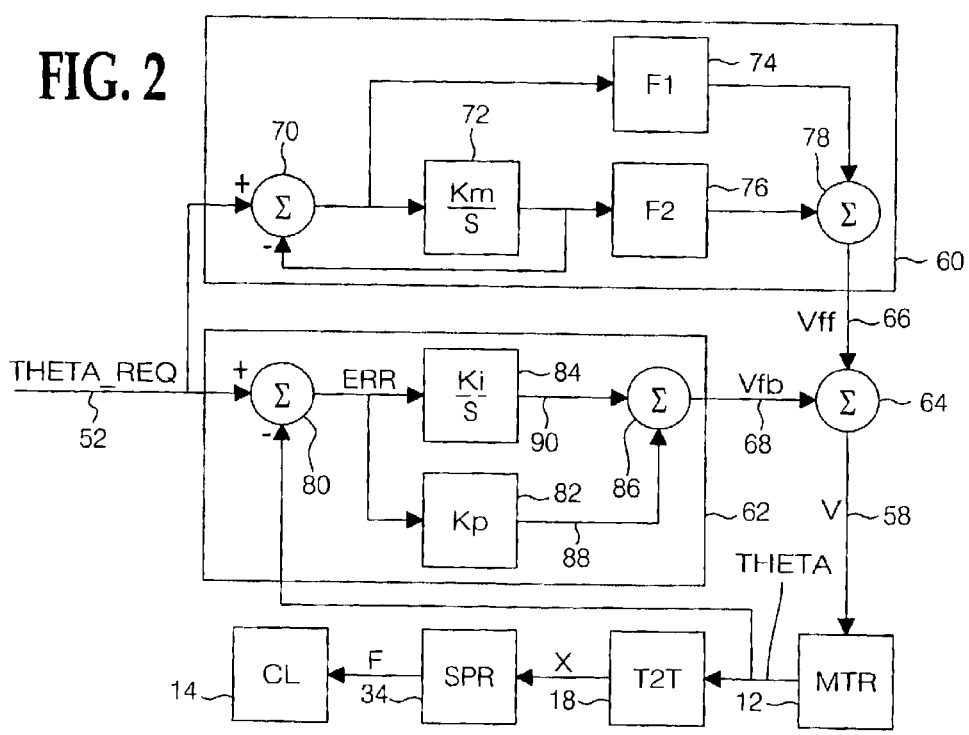
FIG. 2 is a block diagram illustrating the control carried out by the control unit of FIG. 1 according to this invention.

The motor position control carried out by control unit 50 is depicted by the block diagram of FIG. 2, and may be generally characterized as a feedforward-plus-feedback control. Referring to FIG. 2, blocks representing the electric motor 12, the torque-to-thrust converter (T2T) 18, the spring 34 and the clutch 14 are designated by the same reference numerals as in FIG. 1. The input to motor 12 is the drive voltage V, the input to the torque-to-thrust converter 18 is the motor output shaft position THETA, the input to the spring 34 is the lineal position x of the output member 30, and the input to clutch 14 is the spring force F. The blocks within the region 60 constitute the feedforward control, and the blocks within the region 62 constitute the feedback control. The block 64 forms the motor drive voltage V as the sum of a feedforward component Vff on line 66 and a feedback component Vfb on line 68.

The functional blocks 70, 72, 74, 76, 78 of feedforward control 60 model the desired motor speed and position response to changes in the requested motor position THETA_REQ. The block 72 is an integrator with gain Km and unity feedback to the summing junction 70. Accordingly, the rate of change in THETA_REQ (that is, the requested angular velocity of output shaft 24) is integrated to model the position response of motor 12. In other words, the output of block 70 models the motor velocity, and the output of block 72 models the motor position. The blocks 74 and 76 store predefined functions F1, F2 of the modeled velocity and position, respectively, and the outputs of function blocks 74 and 76 are summed by the block 78 to form the feedforward motor drive voltage component Vff on line 66. The functions F1 and F2 model the required motor drive voltage V; the function F1 represents the drive voltage required to achieve the modeled speed, and the function F2 represents the drive voltage required to achieve the modeled motor position.

The functional blocks 80, 82, 84, 86 of feedback control 62 produce and respond to motor output shaft position error ERR. The block 80 produces the error signal ERR according to the deviation of the measured position THETA from the requested position THETA_REQ. The block 82 produces a feedback component on line 88 that is proportional to the error ERR by the gain Kp, and the block 84 integrates the error ERR to produce an integral feedback component on line 90. The integral and proportional feedback components are summed by block 86 to form the feedback motor drive voltage component Vfb on line 68.

In summary, the control of this invention provides an improved motor drive control for quickly and accurately producing the desired clutch torque capacity. The feed-forward control term (Vff) provides an estimate of the motor drive voltage required to achieve THETA_REQ, based on the modeled characteristics of motor 12 and torque-to-thrust converter 18, while the physically-based feed-back control term (Vfb) compensates the drive voltage V for modeling errors and various disturbances that affect the output shaft position THETA, providing improved command following.

While described in reference to the illustrated embodiment, it will be understood that various modifications in addition to those mentioned above will occur to those skilled in the art. For example, the torque-to-thrust converter 18 may be different than shown, and so on. Thus, it will be understood that controls incorporating these and other modifications may fall within the scope of this invention, which is defined by the appended claims.

What is claimed is:

1. A method of operation for an electric motor activated clutch mechanism, where an output shaft of the electric motor drives a torque-to-thrust converter that is mechanically coupled to the clutch mechanism, the method comprising the steps of:

developing a feed-forward activation value for achieving the requested angular position based on a model of the motor and on frictional characteristics of the torque-to-thrust converter by:
modeling a desired position response and a desired speed response of said motor to changes in the requested angular position;
determining a first motor activation value for achieving the modeled position response, and a second motor activation value for achieving the modeled speed response; and
summing the first and second motor activation values to form said feedforward activation values;
activating the motor in accordance with said feed-forward activation value;
measuring an angular position of the motor output shaft; and
adjusting said feed-forward activation value in accordance with a feed-back adjustment based on a deviation of the measured angular position from the requested angular position.

2. The method of claim 1, wherein the position response and speed response of said motor are modeled by integrating a difference between the requested angular position and an integration result, where said difference models the desired speed response and said integration result models the desired position response.

3. The method of claim 1, including the steps of:
integrating the deviation of the measured angular position from the requested angular position to form a first adjustment value;
calculating a second adjustment value in proportion to the deviation of the measured angular position from the requested angular position; and
summing the first and second adjustment values to form said feedback adjustment.

* * * * *